Tanner & Gorton
Curtain Fixture,
Nº 27,749. Patented Apr. 3, 1860.
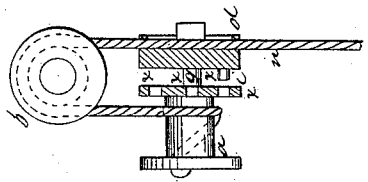
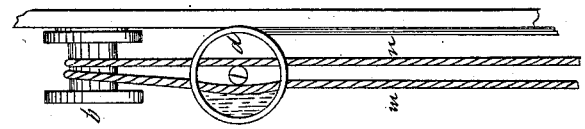
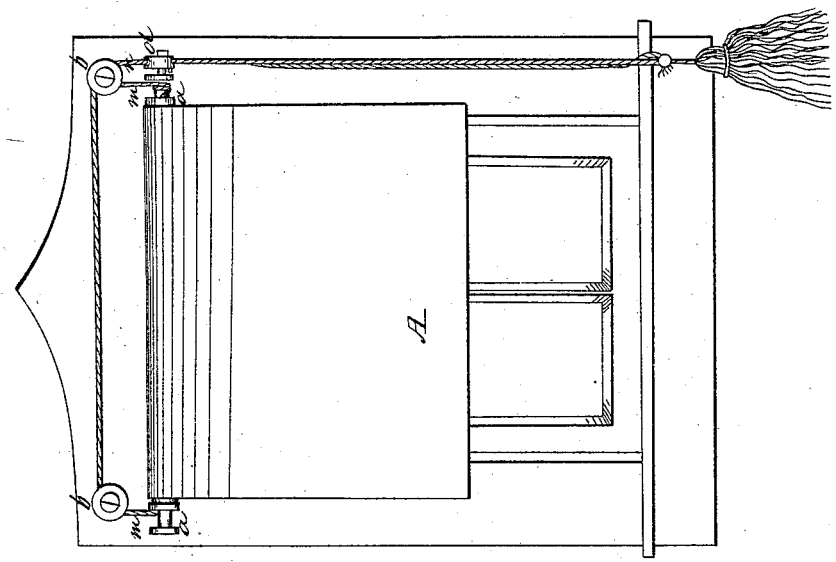
Witnesses
F H Alexander
Mun Radcliffe
Inventor
Albert W Tanner
Orlando P Gorton

UNITED STATES PATENT OFFICE.

ALBERT W. TANNER AND ORLANDO P. GORTON, OF PAW PAW, MICHIGAN.

WINDOW-CURTAIN FIXTURE.

Specification of Letters Patent No. 27,749, dated April 3, 1860.

*To all whom it may concern:*

Be it known that we, ALBERT W. TANNER and ORLANDO P. GORTON, of Paw Paw, in the county of Van Buren and State of Michigan, have invented certain new and useful Improvements in Fixtures for Window-Curtains; and we do hereby declare the following to be a full, clear, and exact description of the same, reference being had to the accompanying drawings and to the letters of reference marked thereon.

The nature of our invention consists in so constructing and arranging such devices as will be hereinafter mentioned, that the curtain can be either raised from the bottom or lowered from the top of the window, or if desired placed at any inclination.

To enable others skilled in the art to make and use our invention we will now describe its construction and operation.

In the drawings Figure (1) is a front elevation. Fig. (2) is a side elevation. Fig. (3) is a sectional view of the spool, pulley, and wheel, with one cord attached.

In Fig. (1) (*b b*) represent two small pulleys which are pivoted upon each side, and at the top of the casement of the window.

(A) represents the curtain, which is secured at its top, to an ordinary roll. (*a a*) are two spools or bobbins which are fastened to each end of said roll, as fully shown in Fig. (1). It will be seen that the outside of the right hand spool or bobbin is provided with four small holes as shown by the letters (*x x x x*) in Fig. (3). The object of these holes will be more fully seen hereafter.

(*d*) represents a small wheel which is provided on the side next to the spool with the pin (*i*). Said wheel has also two holes passing through its rim or projection, as seen in Fig. (2).

(*g*) represents a shaft extending out from the center of the right hand bobbin or spool, upon which the wheel (*d*) is placed loosely. Said wheel is not designed to revolve upon the shaft (*g*), but to remain stationary, or merely to rise and fall with the roll.

(*m, n*) represent two cords, one of which is secured to the left hand spool, and is then passed over the pulleys (*b b*), as fully shown in Fig. (1), and down through the wheel (*d*). The other is likewise fastened to the spool on the opposite side, and passes over and around the pulley immediately over it and then down in like manner through the hole in wheel (*d*), as seen in Fig. (2). A weight is then fastened to their ends. Said weight should be of sufficient size to exactly balance the curtain in any position.

The operation of our invention is as follows: If the curtain is drawn out to its full length and it is desired to lower it from the top, the pin (*i*) is disengaged from the hole in the spool, and the curtain immediately falls. Should you then wish to elevate it, or roll it up, pull the cord until it is sufficiently high. The weight will balance it at any position. The curtain may again be drawn its full length by slipping the wheel (*d*) to one side by means of the cord, and pulling it (the curtain) down.

Having thus fully described our invention, what we claim, and desire to secure by Letters Patent, is—

1. The employment of the wheel (*d*) when the same shall be constructed and used substantially as and for the purpose specified.

2. We claim the spools (*a a*) pulleys (*b b*) and cords (*m*) and (*n*) in combination with wheel (*d*), the whole being constructed and arranged substantially as and for the purpose set forth.

ALBERT W. TANNER.
ORLANDO P. GORTON.

Witnesses:
JOHN T. CLAPP,
I. H. SIMMONS.